United States Patent
Smith et al.

(10) Patent No.: US 6,381,406 B1
(45) Date of Patent: Apr. 30, 2002

(54) ADAPTIVE SYNCHRONOUS DC FAN SPEED CONTROLLER

(75) Inventors: Robert B. Smith, Loveland; David R. Maciorowski, Parker, both of CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/798,402

(22) Filed: Mar. 2, 2001

(51) Int. Cl.[7] .................................................. H02P 7/50

(52) U.S. Cl. ........................ 388/911; 318/254; 318/439; 318/138; 318/721

(58) Field of Search ................................. 318/799, 811, 318/461, 463, 254, 439, 138, 700, 705, 721, 720; 388/804, 811, 819, 911

(56) References Cited

U.S. PATENT DOCUMENTS

| | | | | |
|---|---|---|---|---|
| 3,617,844 A | * | 11/1971 | Grygera ....................... | 318/331 |
| 4,348,625 A | * | 9/1982 | Sharp .......................... | 318/757 |
| 4,443,742 A | * | 4/1984 | Schneider ..................... | 318/85 |
| 5,268,623 A | * | 12/1993 | Muller ......................... | 318/434 |
| 5,563,980 A | * | 10/1996 | Chen et al. .................. | 388/811 |
| 6,008,603 A | * | 12/1999 | Jones et al. .................. | 318/254 |
| 6,054,823 A | * | 4/2000 | Collings et al. ............ | 318/439 |

* cited by examiner

*Primary Examiner*—Robert E. Nappi
*Assistant Examiner*—Rina I. Duda

(57) ABSTRACT

A method and apparatus for controlling the speed of a voltage-controlled fan by locking the pulse-width modulated speed control voltage to a tachometer signal of the fan is presented. By triggering the off time of the PWM pulse to the detection of the tachometer signal and ensuring the off time is less than one tachometer period, no phase and frequency information is lost.

12 Claims, 4 Drawing Sheets

ADAPTIVE SYNCHRONOUS DC FAN SPEED CONTROLLER

FIELD OF THE INVENTION

The present invention pertains generally to DC fan speed control, and more particularly, to a method and apparatus for adaptively controlling the speed of a DC fan.

BACKGROUND OF THE INVENTION

Rotary fans are important components in cooling systems of electronic assemblies. Air-cooled systems typically operate by attaching heat sinks to the heat dissipating electronic components of the assemblies and generating an airflow across the heat sinks using fans.

While prior art air-cooled systems often used voltage-controlled fans in an open-loop configuration, today it is recognized that control of the fans is beneficial for both speed control and synchronization. In speed controlled systems, fan speed is usually driven by the ambient temperature inside the assemblies. By adjusting the fan speed to a speed that will meet the system cooling specifications yet less than the fan's maximum abilities, significant audio noise reduction and power consumption reduction can be achieved. In addition, control of the fan speed to a lower speed that still meets the cooling specifications reduces wear to the fan.

It is also recognized that by synchronizing all the fans in a multiple-fan system, fan-to-fan beat frequencies can be eliminated. In addition, fan synchronization provides reduced perceived audio noise, reduced chassis vibration modes, more uniform air flow, and constant air flow over time and fan aging.

Fan speed control circuits rely on adjusting the voltage/power supplied to the fan and/or the load on the fan. In voltage controlled fans, fan speed is proportional to amount of voltage applied. Feedback from the fan's tachometer is often used to close the loop and servo the voltage applied to the fan to more accurately control speed and sometimes phase. For DC fans, in prior art solutions, voltage adjustment was achieved using either series pass regulation or relatively high speed PWM and filtering.

Series pass voltage regulation is problematic because series pass elements are relatively inefficient. Much of the total power required to drive the fan is lost in the series pass element and therefore requires additional heat removal capability serviced usually by the fan and results in further inefficiencies to the system. Also, the additional heat often requires a heat sink to keep the control element from over-heating.

Another prior art method for controlling fan speed is the use of pulse width modulation (PWM). Using the PWM method, a voltage is fed through a switch, which applies the voltage to the fan as a train of pulses, encoding the speed of the fan in the width of the pulses. The PWM method is considerably more efficient than linear regulation because theoretically it is a lossless circuit. In a pure PWM control, the voltage input to the fan is a square wave signal with varying duty cycles. Pure PWM control is problematic because when the PWM output voltage is zero, no power is supplied to the tach sensing circuitry on the fan, and therefore no tach information is generated. One can increase the frequency of the PWM signal to get tach information with negligible error. However, this technique is problematic because conventional fans are not designed to have power applied and removed at such a high frequency. Accordingly, PWM control techniques usually include a filter which operates to smooth the PWM signal voltage to fan such that the fan does not completely lose power during normal operation. This eliminates the loss of tach information.

High speed (typically >10 KHz) PWM followed by filtering is more power efficient than series pass regulation but, as just described, requires additional cost, components (filter components including an inductor, diode, and capacitor), and board space to implement the desired function. In addition, high speed PWM can introduce significant EMC problems due to the high speed edges of the switching signals.

Accordingly, a need exists for a method and controller that controls DC fan speed without the power inefficiencies associated with the series pass regulation method or the cost associated with current PWM methods. A need also exists for a compact fan speed controller that occupies as little space as possible.

SUMMARY OF THE INVENTION

In accordance with the invention, the problems of the prior art are overcome using a novel method and apparatus for controlling the speed of a fan. In accordance with the invention, a fan controller receives a system-generated speed signal SYNC and a tachometer signal TACH from the fan. When voltage is applied to the fan, the fan rotor begins to spin and generates a tachometer signal TACH one or more times per full revolution of the rotor, each TACH signal having a fixed tach period. The controller generates a pulse-width modulated signal PWM_OUT which is used to turn the fan motor on and off. The controller adjusts the width of the PWM_OUT pulses to the fan such that the fan's speed will either decrease or increase until the tach signal TACH matches the frequency and phase of the control signal SYNC.

In order to allow the controller to properly operate using low-frequency PWM signals, the controller synchronizes the off time PWM_OUT signal with the detection of the TACH signal and guarantees that the off time is always less than one TACH period. This ensures that the power to the fan is always turned on by the time the TACH signal arrives, and is therefore detected by the controller. Accordingly, accurate tach data is available for calculation of the next "off" period of the power to the fan, and pulse width modulation can be accomplished at a tach frequency of less than 200 Hz without losing any tach phase or frequency information.

In addition, the controller of the invention also generates a fan status output STATUS that represents the fan's ability to maintain the requested speed. The status output STATUS encodes Normal, Failing, and Failed fan status. Appropriate thresholds are chosen allowing the prediction of fan failure before the actual failure occurs.

DETAILED DESCRIPTION

Figure 1:
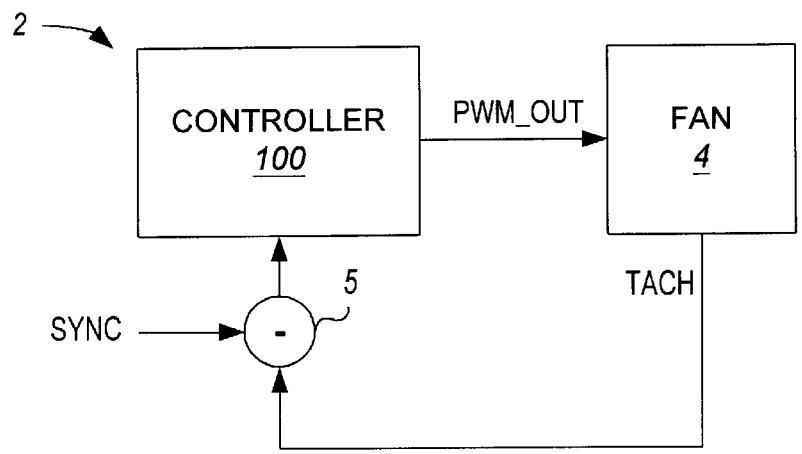
FIG. 1 is a schematic block diagram of an adaptive synchronous DC fan controller in accordance with the invention.

FIG. 1 is a schematic block diagram of an adaptive synchronous DC fan control system 2 in accordance with the invention. As illustrated, control system 2 is a phase locked loop (PLL) which locks the tachometer signal TACH of a fan 4 to an input sync pulse signal SYNC using an adaptive PWM output signal PWM_OUT which is input to the voltage control input of the fan 4. The tachometer signal TACH received from the fan 4 is fed back to the controller and used as reference for measuring the speed error. The control system 2 calculates the difference between the SYNC pulse and TACH pulse using summing circuit 5. Controller 100 adjusts the duty cycle of the PWM_OUT signal while also ensuring that the PWM_OUT signal is always ON at the rising edge of the TACH signal so as to ensure detection of every TACH signal to eliminate loss of tach information. In order to ensure detection of every TACH signal, the OFF time of the PWM_OUT signal is adapted to the characteristics of the fan via the tach signal TACH, as discussed hereinafter. Thus, the PWM_OUT signal is always synchronized to the rotation of the fan motor.

In the preferred embodiment, the PLL is implemented as a DPLL (Digital Phase Locked Loop), using a simple microprocessor to convert the SYNC and TACH signal information to a PWM signal PWM_OUT which controls the fan motor 4. The DPLL utilizes velocity, acceleration and phase components to accurately stabilize the speed and phase of the fan 4. Thus, controller 100 performs adaption in the form of an integration of the velocity error and phase error. In particular, integration on the displacement (i.e., amplitude of the calculated error) determines the amount of change to make in the duty cycle of the PWM output signal PWM_OUT (i.e., how fast to go), and integration on the difference (polarity) determines the direction of change in the duty cycle of the PWM output signal PWM_OUT (i.e., whether to slow down or speed up).

Figure 2:
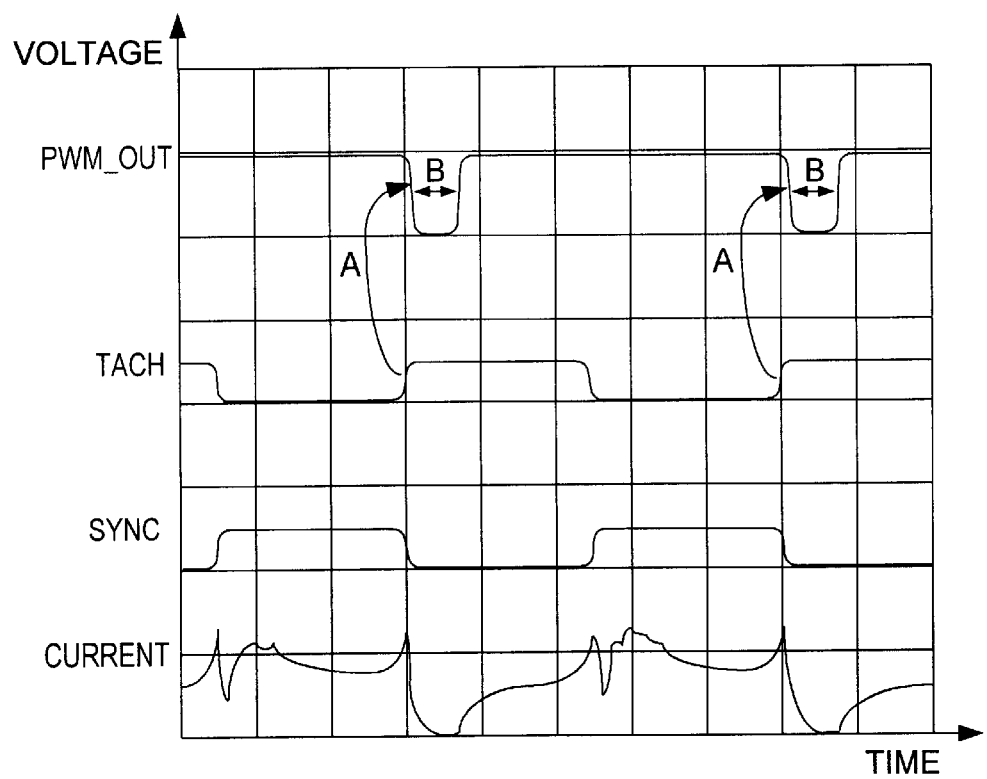
FIG. 2 is a timing diagram illustrating the relationships between the various fan controller signals of a fan controller implemented in accordance with the invention.

FIG. 2 is a timing diagram illustrating the relationships between the input signal SYNC, the fan motor signal TACH, and control signal PWM_OUT to the fan. As known by those skilled in the art, pulse width modulation (PWM) is a technique by which a signal is encoded in the width of a fixed frequency pulse. The duty cycle of the pulse period determines the average magnitude of the signal. PWM control of a fan thus operates to turn ON the power to the fan motor for a period proportional to the width of the PWM_OUT pulse. In particular, a driving voltage is applied to the fan motor at the rising edge of the PWM_OUT signal, and voltage is continuously applied until the falling edge of the PWM_OUT signal is detected, at which time the driving voltage is removed from the fan motor.

According to the invention, the PWM_OUT pulse period is measured from the rising edge of the tach signal TACH. The rising edge of the tach signal TACH triggers the falling edge of the PWM_OUT signal. Accordingly, in one sense, it is really the OFF portion of the PWM signal that is varied by the controller, while the width of the ON time is automatically varied according to the width of the OFF time and the time the next TACH pulse is received from the fan. This is important because by triggering the OFF portion of the pulse from the rising edge (or point of detection) of the TACH pulse, it ensures that the PWM_OUT signal will be in the ON state supplying power to the fan motor at the time the next TACH pulse is generated by the fan motor, and therefore the TACH pulse is guaranteed to be detected. Accordingly, unlike in prior art PWM fan controller methods, no loss of tach information occurs.

With this in mind, FIG. 2 shows the PWM_OUT signal initially at a high voltage level, corresponding to the ON state of the fan motor. As shown, the PWM_OUT signal remains ON until the rising edge of the tach signal TACH at point A, which triggers the falling edge of the PWM_OUT signal. (It will be noted that although the power to the fan motor has been turned OFF, the tach signal TACH remains high. This is characteristic of voltage controlled DC fans that when the power is OFF, the tach signal will default to the high state. Eventually (but within a single tach period), the power is turned back on by the PWM_OUT signal until the next tach rising edge is detected. Thus, by synchronizing the OFF time of the PWM_OUT pulse with the rising edge TACH, the period of time that the power is OFF is guaranteed to be during a portion of the rotation of the motor when the tach rising edge will not be generated. The controller 100 determines the length of the OFF time, or "dead time", shown at point B, based on the present value encoded in the PWM signal PWM_OUT that is fed to the fan and the measured difference between the sync pulse SYNC and tach pulse TACH received from the fan.

Figure 3:
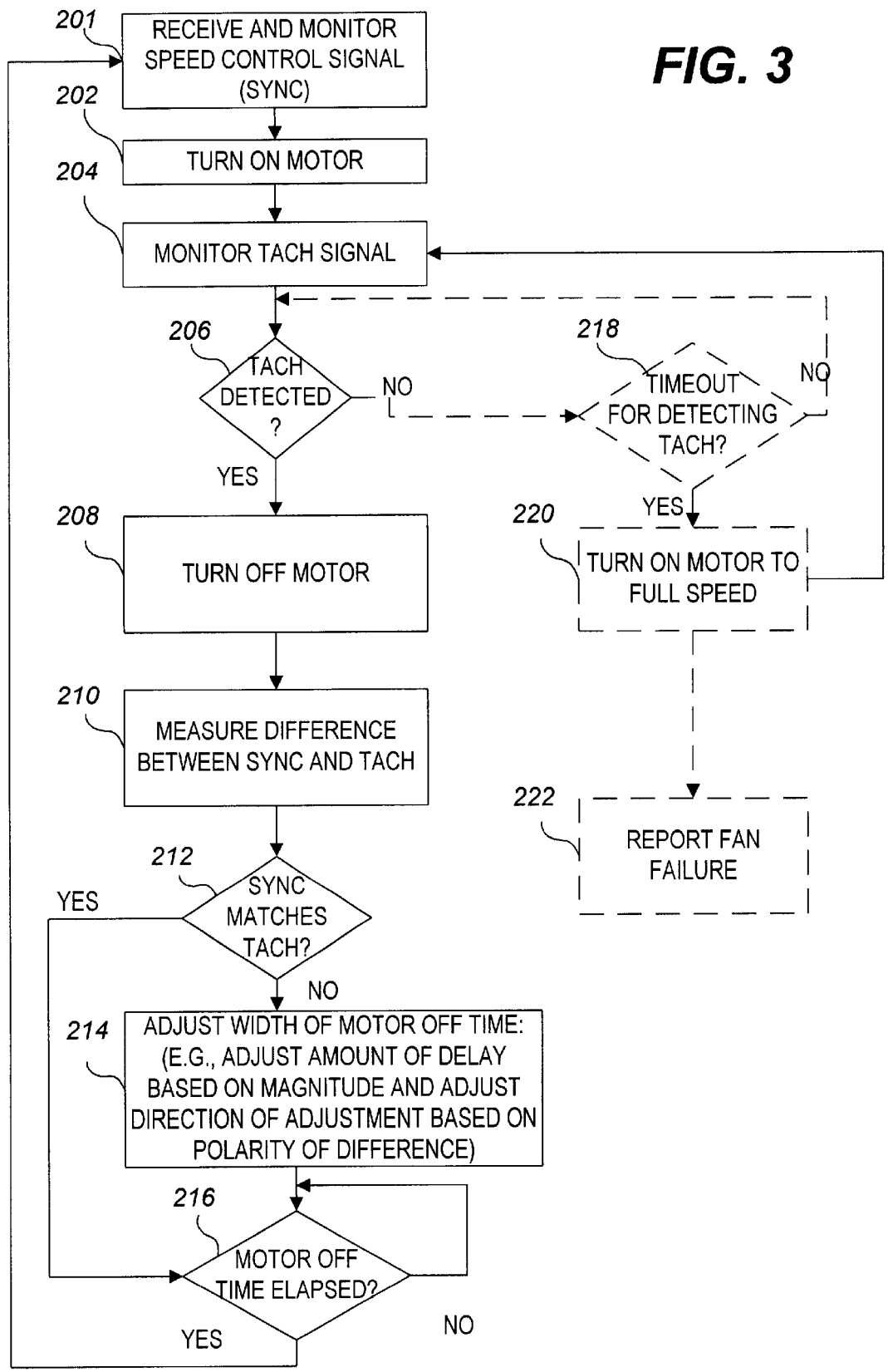
FIG. 3 is an operational flowchart illustrating an exemplary embodiment of the steps performed by the controller.

FIG. 3 is an operational flowchart illustrating a preferred embodiment of the steps performed by the controller 100. As illustrated, when the controller 100 powers up, it turns on 202 the fan motor and awaits 204 a tach signal. When a tach signal is detected 206, the controller 100 turns off 208 the fan motor. The controller 100 measures 210 the difference between the SYNC and TACH pulses. In the preferred embodiment, the measurement is taken from the rising edge of each pulse. The difference in arrival times of the respective rising edges is the error. If the SYNC and TACH pulses are synchronous, as determined in step 212, no adjustment of the duty cycle of the PWM_OUT signal is performed. If the SYNC and TACH pulses are not synchronous, as determined in step 212, the controller adjusts 214 the duty cycle (in particular the OFF time) of the PWM_OUT pulse. In particular, the magnitude of the error is used to determine how much to change the present OFF time of the PWM_OUT pulse, while the polarity of the error (based on whether the SYNC or TACH arrives first) is used to determine which direction to adjust the OFF time (i.e., whether to shorten or lengthen the OFF time). The amount of time elapsed from the time the motor is turned OFF in step 208 is monitored 216, and when the amount of time equal to the adjusted OFF time elapses, the motor is turned ON 202 and the process repeats.

Accordingly, by triggering the start of the OFF time of the PWM_OUT pulse from the detection of the TACH signal, the off time is adapted to the characteristics of the fan via the tach signal TACH, and the fan control signal PWM_OUT is always synchronized to the rotation of the fan motor. In the illustrative embodiment, the fan motor comprises two tachometers positioned 180° from one another on the circumference of the fan rotor. Accordingly, a TACH signal is generated once every half revolution of the rotor. Since the TACH signal is always generated at the same two respective fan rotor positions, and the power is always turned on prior to the rotor reaching those positions (i.e., within one tach period, each tach period comprising the time it takes to spin the rotor a half revolution to the next tach), the controller detects every fan motor tach to ensure no loss of tach information. As the fan speeds up, the TACH pulses get closer together, so the adaptive controller 100 adjusts the length of the rotation window to ensure that the power is always on when the next TACH pulse arrives. In the preferred embodiment, the length of the rotation window is determined by measuring the length in time of the previous tach period and calculating a predicted rotation period for the next tach period that is a small amount less than the measured previous tach period to insure that the predicted period will always be slightly shorter than the actual period can be.

Preferably, the controller may implement protection logic that ensures that if a failure occurs in either the fan or control system, then the fan will receive a PWM_OUT signal corresponding to a maximum fan motor voltage. In the illustrative embodiment, this is implemented by setting a timeout 218 on detection of the TACH pulse, and if the timeout period elapses, setting the motor voltage such that the fan operates at full speed 220 and reporting a fan failure 222 to the system management. In the preferred embodiment, a failure of either the fan tach or controller circuit will automatically result in a default PWM_OUT signal at the maximum fan voltage. In the preferred embodiment, the maximum fan voltage is 48 volts DC.

Figure 4:
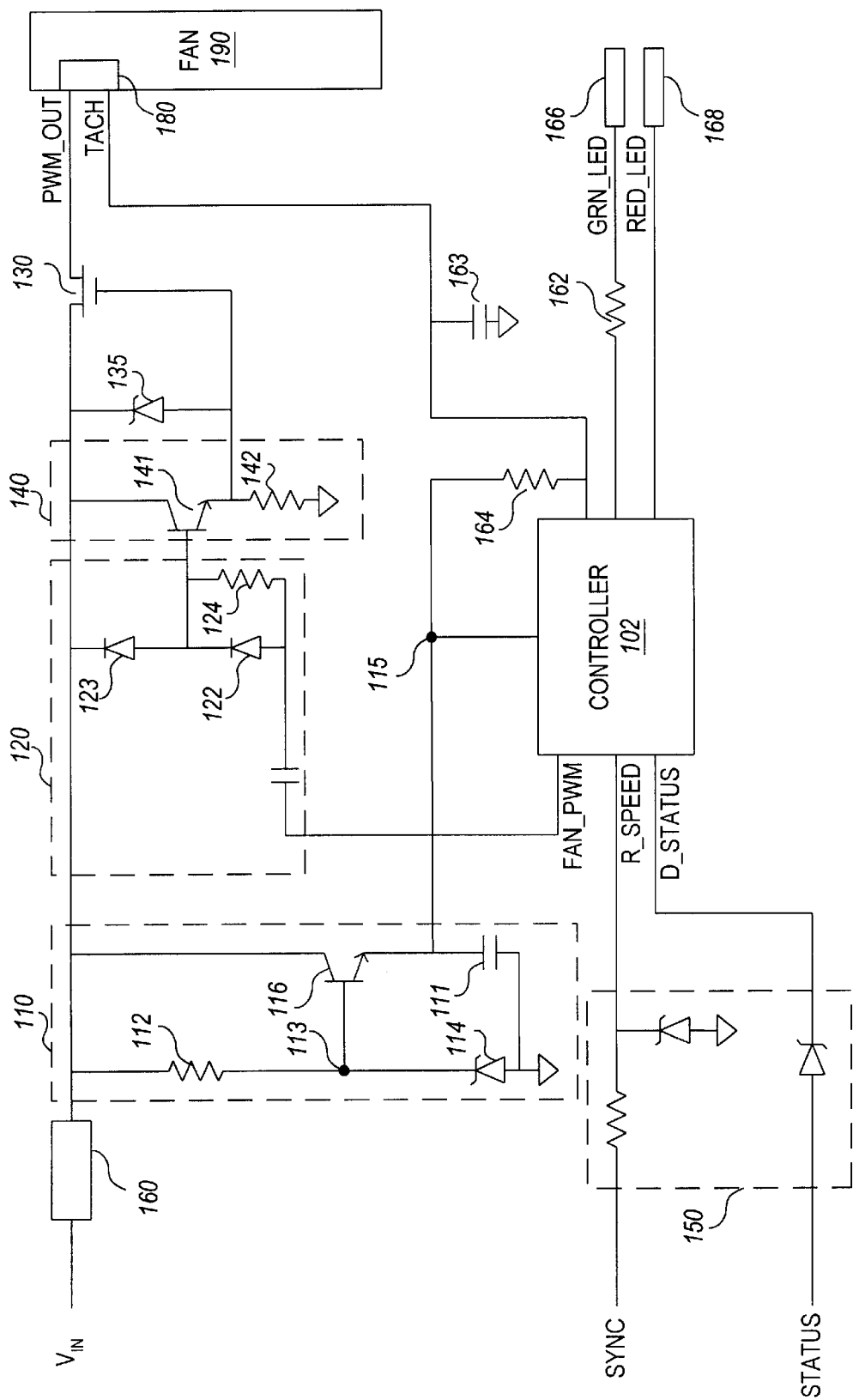
FIG. 4 is detailed schematic diagram of a preferred embodiment of the invention.

FIG. 4 is a schematic diagram of a preferred embodiment of the adaptive synchronous DC fan controller 100 of the invention. As shown, controller 100 comprises a microprocessor 102, a voltage translation circuit 120, a PWM output switch FET 130, a protection diode 135, a low-power series pass regulator 110, a fuse 160, an isolation/hot swap circuit 150, and a pair of indicator LEDs 166, 168.

The control circuit 100 is powered by a DC voltage at input $V_{IN}$. In the illustrative embodiment, $V_{IN}$ is 48 volts. Accordingly, it must be stepped down to a level compatible to the integrated circuit(s) used in the circuitry, namely the microprocessor 102. In the illustrative embodiment, the microprocessor 102 requires a 5 volt power source. In the illustrative embodiment, the voltage regulator circuit 110 is implemented as a low power series pass voltage source, formed as shown using a series-coupled resistor 112 and zener diode 114 between the input Vin and circuit ground in parallel with a switching device, transistor 116. The source of the transistor 116 is coupled to the voltage input Vin (protected by fuse 160 which interrupts current to the fan and controller in case of component failure) and the drain is the output of the regulator, which is connected to the power input of the microprocessor 102. The output voltage of the zener diode 114 present on node 113 controls the gate of a transistor 116. Accordingly, the reference point of the zener diode 114 is set to the level of the high voltage level expected by the transistor 116 for turning on the transistor. In the illustrative embodiment, this level is 5 volts, so a 5 volt zener diode is selected. When the transistor 116 is turned on by applying the input voltage Vin (assuming the fuse is intact), the drain of the transistor will place a voltage on line 115 that is equal to the voltage on node 113 less the threshold voltage of approximately 0.6 volts. Accordingly, in the illustrative embodiment, the voltage on line 115 is held at approximately 4.4 volts, which is within the acceptable power specifications of the microprocessor 102.

Microprocessor 102 receives a square-wave speed signal SYNC from an external source and a square-wave tach signal TACH input from the fan 4. In the preferred embodiment, the speed signal SYNC is generated by a temperature monitoring circuit that senses the temperature within the cage housing the circuits to be cooled, and sets the rate of the speed signal pulses according to the sensed temperature, increasing the rate as the temperature increases. Alternatively, the rate of the sync signal pulses may be set to a pre-selected rate, and generated by means of a simple oscillator circuit.

The microprocessor 102 generates an output FAN_PWM which is input to the voltage translation circuit 120. Voltage translation circuit 120 comprises a capacitor 121, coupled in series between the output FAN_PWM and input of parallel-coupled first diode 122 and resistor 124. A second diode 123 is coupled between the output of parallel-coupled first diode 122 and resistor 124 and the voltage source Vin to provide voltage level translation, DC blocking, and a bias network to adapt the low voltage logic from the microprocessor to the level needed for the PWM switch driver 140.

Transistor 141 and resistor 142 form the inverting switch driver 140 which drives the gate of the PWM switch transistor 130. A diode 135 has an input coupled to the output of the inverting switch driver 140 and the voltage source Vin to provide over-voltage protection for the gate of PWM switch transistor 130. In operation, the DC voltage $V_{IN}$ is applied to the controller circuit 100 under the control of the microprocessor 102 through the PWM switch transistor 130. When voltage is applied to the fan 4, the fan rotor begins to spin and generates a tachometer signal TACH once per full revolution of the rotor. Microprocessor 102 compares the tach signal TACH received from the fan to the control signal SYNC and adjusts the width of the power pulses (FAN_P) to the fan such that the fan's speed will either decrease or increase until the tach signal TACH matches the frequency and phase of the control signal SYNC. The microprocessor 102 dynamically adapts the power pulses such that while the duty cycle changes, the power to the fan 4 is always turned on during a small window when the tach signal TACH makes a transition. This insures that accurate tach data is available for calculation of the next OFF time of the PWM_OUT signal to the fan. By comparing consecutive TACH edges and control signal SYNC edges, pulse width modulation can be accomplished at a much lower tach frequency (less than 200 Hz) than has been done in prior art and without losing any tach phase or frequency information.

The microprocessor 102 also generates a fan status output STATUS that represents the fan's ability to maintain the requested speed. The status output STATUS encodes Normal, Failing, and Failed fan status. Appropriate thresholds are chosen allowing the prediction of fan failure before the actual failure occurs. In the preferred embodiment, the fan controller module is a four wire device. Two wires are required for power (48V) and ground (48V return). One wire for SYNC and speed control from the system and one wire STATUS for reporting fan status. In the preferred embodiment, the SYNC line is driven by 3.3V CMOS or 5V TTL logic from the system at a frequency in the range of 19 to 160 Hz.

In the preferred embodiment, the fan status line STATUS is an open collector/drain signal with a pull-up resistor located in the system. When the fan is running in synch with the command signal this line will be pulled low by the fan circuit. When fan synch fails, this line will have a high impedance to indicate failure. Preferably, the status signal is implemented according TABLE 1 below:

TABLE 1

| Status Line State | Meaning |
|---|---|
| Pulled low | Fan at speed and in synch or not at speed for <6 seconds. |
| Pulsing low-high | Fan not matching speed/synch pulse for >6 second |
| High Impedance | Failed/stalled or Absent |

The Pulled Low state is entered when there is a constant phase angle between synch and tach signals and no frequency difference. The Pulsing state is entered when the fan tach pulses are not "in step" with the synch pulses for more than 6 seconds. In this state the Status output will go high when the rising edge of the synch pulse is detected. It will stay high for N*100 usec. and then return low until the next rising edge on synch according to the formula:

$$N=Int[(|S-T|)/100],$$

where S is the spacing between synch rising edges in microseconds and T is the spacing between tach rising edges. N may range from 0 to 255 counts. When N=0, Pulsing Low-High state is exited and the Pulled Low state is entered.

The High impedance state can be entered in two ways. The first case is if N>5 and if N>1 has persisted for more than six seconds. The second case is if the fan is unpowered (due to a blown fuse, not plugged in, etc.). The only way to exit this state is if N=0.

The status output STATUS may also be used to map each possible status (Normal, Failing, and Failed) to a different LED 166, 168 on/off/blinking pattern and/or color. The use of LEDs 166, 168 is advantageous because it immediately alerts an operator of the fan status without any complicated diagnostics or tool requirements. In an illustrative embodiment, the state of the LEDs is implemented according to Table 2.

TABLE 2

| LED State | Meaning |
|---|---|
| On Green | At speed and in synch or Not at speed for <6 seconds. |
| Flash Yellow | Not keeping up with speed/synch pulse for >6 second |
| Flash Red | Failed/stalled or 500 usec slow/fast for >6 seconds |
| Off | Fan not present or no power or failed |

It will be appreciated that the low component count and low heat dissipation characteristics of the controller design allows the entire fan controller circuit to be built compactly on a simple one-sided printed circuit board (PCB), with the second side used as a ground plane. The board need only provide space for an input connector, the input fuse 160, the 5-volt regulator 110 that powers controller logic, the microprocessor 102, the indicator LED(s) 166 and 168, the voltage level translation circuit 120, the switching element mosfet 130 which controls power to the fan, and an output connector to the fan. In the preferred embodiment, the control circuit occupies only about a square inch of board area.

Figure 5:
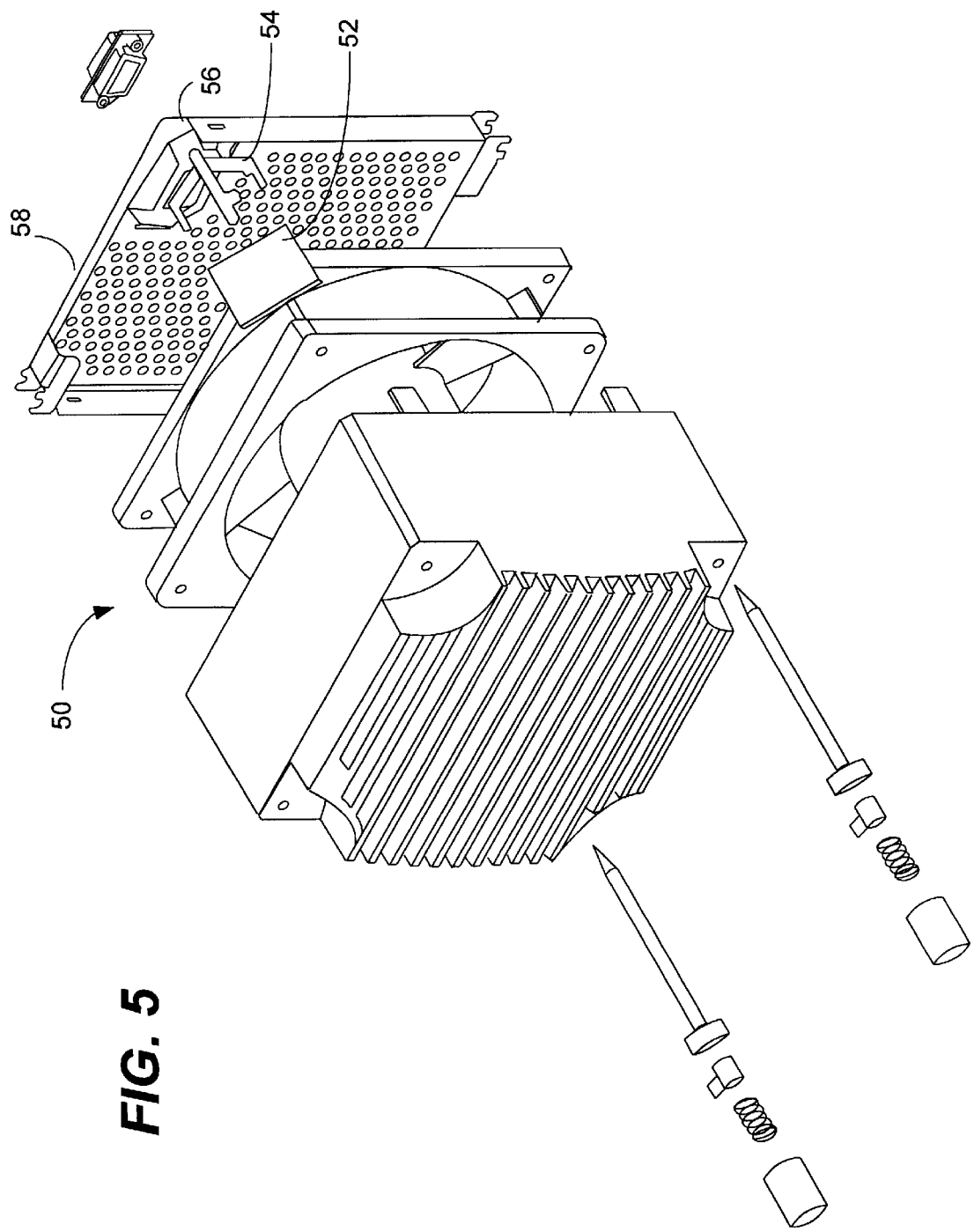
FIG. 5 is an exploded isometric view of a fan unit assembly incorporating the controller of the invention.

FIG. 5 is an exploded isometric view of a fan unit assembly 50 incorporating the controller of the invention. As illustrated, the fan controller 100 is implemented on a PCB 52, which is small enough to snap into a bracket 54 in the corner 56 of a fan housing 58 as illustrated in FIG. 5.

Often, multiple fans units are arranged together to cool a system. For example, in a multi-slot modular printed circuit board (PCB) cage assembly, multiple fans may be arranged in a grid planar to one side of the cage in order to provide even air flow across all the PCBs in the system. In a fan grid for a PCB cage assembly, each fan unit is controlled by its own fan control circuit 100, yet each fan may receive a common synchronous speed signal SYNC generated by a system manager circuit. The use of independent modular fan units that include independent fan controllers allows replacement of the entire fan unit without affecting any of the other fan units in the system.

It will be appreciated from the above detailed description that the invention offers many advantages over the prior art. In particular, the adaptive synchronous DC fan speed controller provides remote fan speed adjustment that allows all fans in a system to be synchronized in both speed and phase regardless of relative load or location, and desired airflow can be guaranteed. Each individual fan speed controller adapts to local variations in airflow resistance introduced by system elements in the flow path. A default speed may be provided to run the fan at an optimum speed when external control is not available. Because of the adaptive nature of the controller, it can be used with fans of different size and manufacture. Fail-safe mechanisms are incorporated to maximize continued fan operation in the event of a fault either in the controller circuit or in the system. The status and LEDs provide an early warning mechanism sign to allow prediction of a fan failure long before failure is imminent without introducing false failure indications. The controller provides continuous fan diagnostics to the host system without requiring significant host system bandwidth. Also, because the fan circuit can be incorporated in the mechanical fan housing, costly real estate in the system can be freed up for other circuits. Component count and therefore cost is kept to a minimum. In addition, a failed fan does not disrupt the performance of other fans in the system. Because each fan has its own speed controller, if a fan fails, the entire fan unit (including controller) can be replaced without affecting system operation.

What is claimed is:

1. A method for controlling a voltage-controlled fan, comprising:

receiving a speed signal, said speed signal indicating a fan speed;

monitoring a tachometer signal generated by said fan;

turning off voltage to said fan upon detection of said tachometer signal;

determining a delay based on said speed signal and said tachometer signal;

waiting said delay time; and turning on voltage to said fan after said delay time.

2. A method in accordance with claim 1, comprising:

repeating said receiving step through said turning on step.

3. A method in accordance with claim 1, wherein said determining step comprises:

measuring the difference in phase and frequency between said speed signal and tachometer signal; and adjusting said delay time to synchronize said phase and said frequency of said tachometer signal to said speed signal.

4. A method in accordance with claim 1, wherein:

said delay time is less than one tach period.

5. An adaptive synchronous DC fan controller for a fan, said fan comprising a rotor and a voltage-controlled input, and a tachometer output which outputs a tachometer signal for one or more fixed rotational positions of said rotor, comprising:

a phase locked loop receiving a speed control signal and said tachometer signal and generating a pulse-width modulated (PWM) signal for input to said voltage-controlled input;

wherein an OFF time of said PWM signal is triggered from receipt of said tachometer signal and has a duration based on a measured difference between said speed control signal and said tachometer signal.

6. An adaptive synchronous DC fan controller in accordance with claim 5, wherein:

said duration of said OFF time is adjusted in an amount according to the magnitude of said measured difference between said speed control signal and said tachometer signal, and in a direction according to a polarity of said measured difference.

7. An adaptive synchronous DC fan controller in accordance with claim 5, wherein:

said controller is implemented within a fan unit housing of said fan.

8. An adaptive synchronous DC fan controller in accordance with claim 5, wherein:

said controller is implemented on a printed circuit board with and area of less than approximately 1 square inch.

9. A method for generating a pulse-width modulated signal for a voltage-controlled fan, comprising:

monitoring a tachometer signal generated by said fan, said tachometer signal representing one or more fixed rotational positions of said fan;

turning off voltage to said fan upon detection of said tachometer signal; and turning on voltage to said fan prior to said fan generating a next tachometer signal.

10. A method in accordance with claim 9, comprising:

repeating said monitoring step through said turning on steps.

11. A fan unit, comprising:

a voltage-controlled rotary fan comprising a rotor which spins at a speed proportional to an ON time of a pulse-width modulated (PWM) signal, said fan generating a tachometer signal once for one or more fixed rotational positions of said rotor;

a fan controller comprising a phase locked loop receiving a speed control signal and said tachometer signal and generating said PWM signal, wherein an OFF time of said PWM signal is triggered from receipt of said tachometer signal and has a duration based on a measured difference between said speed control signal and said tachometer signal; and a fan unit housing which encases said voltage-controlled rotary fan and said fan controller.

12. A fan unit in accordance with claim 11, wherein:

said controller is implemented on a printed circuit board with and area of less than approximately 1 square inch.

* * * * *